US011068617B2

(12) United States Patent
Shirole

(10) Patent No.: US 11,068,617 B2
(45) Date of Patent: Jul. 20, 2021

(54) SECURE ACCESS TO MULTI-TENANT RELATIONAL DATA

(71) Applicant: Sage Intacct, Inc., San Jose, CA (US)

(72) Inventor: Naveen Shirole, Bengaluru (IN)

(73) Assignee: Sage Intacct, Inc., San Jose, CA (US)

( * ) Notice: Subject to any disclaimer, the term of this patent is extended or adjusted under 35 U.S.C. 154(b) by 898 days.

(21) Appl. No.: 15/728,166

(22) Filed: Oct. 9, 2017

(65) Prior Publication Data

US 2019/0108361 A1 Apr. 11, 2019

(51) Int. Cl.
| | |
|---|---|
| *G06F 21/62* | (2013.01) |
| *G06F 16/245* | (2019.01) |
| *G06F 16/248* | (2019.01) |
| *G06F 16/242* | (2019.01) |
| *G06F 40/177* | (2020.01) |
| *G06F 3/0482* | (2013.01) |

(52) U.S. Cl.
CPC ........ *G06F 21/6227* (2013.01); *G06F 16/245* (2019.01); *G06F 16/248* (2019.01); *G06F 16/2423* (2019.01); *G06F 21/6245* (2013.01); *G06F 40/177* (2020.01); *G06F 3/0482* (2013.01)

(58) Field of Classification Search
CPC .............. G06F 21/6227; G06F 16/245; G06F 16/2423; G06F 16/248; G06F 40/177; G06F 21/6245; G06F 3/0482
See application file for complete search history.

(56) References Cited

U.S. PATENT DOCUMENTS

| | | | | |
|---|---|---|---|---|
| 2002/0083033 | A1* | 6/2002 | Abdo | G06F 16/30 |
| 2005/0256852 | A1* | 11/2005 | McNall | G06F 16/2428 |
| 2007/0156650 | A1* | 7/2007 | Becker | G06F 16/958 |
| 2011/0071995 | A1* | 3/2011 | Fisher | G06F 16/24575 |
| | | | | 707/705 |
| 2012/0215766 | A1* | 8/2012 | Gorelik | G06F 16/248 |
| | | | | 707/722 |
| 2014/0012826 | A1* | 1/2014 | Wisman | G06F 21/6227 |
| | | | | 707/695 |
| 2015/0142783 | A1* | 5/2015 | Bruce | G06F 16/25 |
| | | | | 707/722 |
| 2016/0019287 | A1* | 1/2016 | Oksman | G06F 16/335 |
| | | | | 707/740 |
| 2016/0370955 | A1* | 12/2016 | Wang | G06F 16/26 |

(Continued)

*Primary Examiner* — Irete F Ehichioya
*Assistant Examiner* — Huen Wong
(74) *Attorney, Agent, or Firm* — Raubvogel Law Office

(57) ABSTRACT

Access to an individual tenant's data within a multi-tenant relational database architecture is provided, without unduly exposing data of other tenants. A list of accessible tables is presented to an authenticated individual, such as a developer. Specific information can be designated as sensitive and can be excluded from the information the developer can access. A specialized user interface provides secure point-and-click access to data by allowing selection of a set of higher-level data types to retrieve. Access to data from a related table can be enabled by providing a hyperlink that, when activated, retrieves a relevant record from the related table. Primary key values can also be rendered as hyperlinks that can activate a pop-up menu showing all tables that refer to that primary key value. In at least one embodiment, SQL queries are automatically constructed based on the user's selection of items from the pop-up menu.

30 Claims, 13 Drawing Sheets

(56) References Cited

U.S. PATENT DOCUMENTS

| | | | |
|---|---|---|---|
| 2017/0032136 A1* | 2/2017 | Gangadharappa | G06F 21/6227 |
| 2017/0097964 A1* | 4/2017 | Sorrentino | G06F 16/24578 |
| 2017/0116373 A1* | 4/2017 | Ginsburg | G16H 40/20 |
| 2017/0255627 A1* | 9/2017 | Coll | G06F 16/248 |
| 2017/0315680 A1* | 11/2017 | Yip | H04L 67/02 |
| 2018/0095952 A1* | 4/2018 | Rehal | G06F 16/213 |
| 2018/0129691 A1* | 5/2018 | Mathur | G06F 16/24553 |
| 2018/0330334 A1* | 11/2018 | Gowru | G06F 3/0482 |
| 2018/0365299 A1* | 12/2018 | Bruce | G06F 16/20 |
| 2019/0042573 A1* | 2/2019 | Marcel | G06F 16/489 |
| 2019/0042660 A1* | 2/2019 | Brown | G06F 16/211 |
| 2019/0102571 A1* | 4/2019 | Wang | G06F 21/6218 |
| 2019/0258628 A1* | 8/2019 | Roustant | G06F 16/248 |

\* cited by examiner

DATA 301

CUSTOMER 404

| Tenant# | Record# | Name | ContactKey |
|---------|---------|------|------------|
| 1002 | 2001 | McDonald's | 3001 |
| 1002 | 2002 | KFC | 3002 |
| 1002 | 2003 | Dunkin Donuts | 3003 |

CONTACT 405

| Tenant# | Record# | Address | Zipcode |
|---------|---------|---------|---------|
| 1002 | 3001 | 123 XYZ Way | 96001 |
| 1002 | 3002 | 456 ABC Way | 96002 |
| 1002 | 3003 | 789 DEF Way | 96003 |

INVOICE 406

| Tenant# | Record# | CustomerKey | Amount | InvoiceDate |
|---------|---------|-------------|--------|-------------|
| 1002 | 4001 | 2001 | $250 | 1/1/2017 |
| 1002 | 4002 | 2002 | $300 | 1/2/2017 |
| 1002 | 4003 | 2002 | $350 | 1/3/2017 |

*FIG. 4B*

SECURE ACCESS TO MULTI-TENANT RELATIONAL DATA

TECHNICAL FIELD

The present document relates to techniques for accessing data stored in relational databases.

DESCRIPTION OF THE RELATED ART

An increasing number of cloud-based software-as-a-service deployments use a multi-tenant architecture, in which a single instance of a software application serves multiple customers. Each customer is called a tenant. One advantage of such an architecture is that software development and maintenance costs can be shared among tenants, and updates to the software can be rolled out in one step to all tenants.

Developers working on such software implementations often require access to a company's data in real-time, for example to resolve problems and to test potential solutions. In a multi-tenant architecture, data is often distributed among multiple databases, with different tenants' data located on different databases. In order to access data associated with a tenant, a developer needs to first determine which database stores data for that tenant. Typically, this requires opening a first session to access a global database to identify which specific database contains a particular tenant's data, and then opening a second session to access tenant data itself at the identified database.

In addition, the nature of cloud deployment and multi-tenant architecture can make it very difficult to provide needed access to developers and testers without exposing the company to significant security risks, or adding significant operational overhead. Providing access to tenant data within a database that hosts multiple tenants is problematic, because it can undesirably expose sensitive data associated with other tenants.

SUMMARY

The present document describes improved techniques for securely accessing multi-tenant data in a relational database. According to various embodiments, a user, such as a developer, can securely access a tenant's data without unduly exposing data of other tenants. In addition, the techniques described herein avoid the need for a user to know, in advance, which database contains data related to a particular tenant; the user also does not need to know the organizational structure of the data.

In at least one embodiment, the described system provides secure point-and-click access to production data for a single tenant in a multi-tenant relational database architecture. Once the owner of the data has given consent to allow access, a list of accessible tables are presented to an authenticated user, such as a developer. Specific information can be designated as sensitive and can be excluded from the information the developer can access. The developer can select records from a database table so as to access the desired information.

In at least one embodiment in which the system is implemented in connection with a relational database, a query tool can be provided to allow the developer to select a set of higher-level data types to retrieve, without having to specify particular columns. The query tool provides access to data from a related table, for example by providing a hyperlink that, when activated, retrieves a relevant record from the related table. In at least one embodiment, primary key values can also be rendered as hyperlinks; clicking on such a hyperlink activates a pop-up menu that shows all tables that refer to that primary key value, thus allowing drill-down. In at least one embodiment, SQL queries are automatically constructed based on the user's selection of items from the pop-up menu. These automatically constructed SQL queries can then be logged against the user's account.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIGS. 4A and 4B depict examples of data tables for organizing a data dictionary and underlying data in a tenant database, according to one embodiment.

DETAILED DESCRIPTION OF THE EMBODIMENTS

The systems and methods set forth herein may be applied to data storage systems having any suitable architecture. For illustrative purposes, the description herein references a multi-tenant database architecture wherein each database stores data for one tenant. Any number of physical data storage devices can be used to implement the described system. The particular hardware arrangement depicted and described herein is a simplified example for illustrative purposes. One of skill in the art will recognize that the systems and methods described herein may be implemented in a wide variety of other contexts.

In some embodiments, one or more client devices 101 and/or servers 103, as shown and described in connection with FIGS. 1 and 2, may be used to implement such a system and method. Thus, for illustrative purposes, the system and method may be described in the context of such a client/server architecture. One skilled in the art will recognize, however, that the system and method can be implemented using other architectures, such as for example a stand-alone computing device rather than a client/server architecture.

Further, the functions and/or method steps set forth below may be carried out by software running on the one or more of the client devices 101 and/or servers 103. This software may optionally be multi-function software that is used to retrieve, store, manipulate, and/or otherwise use data stored in data storage devices and/or to carry out one or more other functions.

In this application, a "user" is an individual, enterprise, or other group, which may optionally include one or more users. A "data store" is any device capable of digital data storage. A data store may use any known hardware for nonvolatile and/or volatile data storage. A "data storage system" is a collection of data stores that can be accessed by multiple users. A "computing device" is any device capable of digital data processing. A "server" is a computing device that provides data storage, either via a local data store, or via a connection to a remote data store. A "client device" is an electronic device that communicates with a server, provides output to a user, and accepts input from a user.

System Architecture

According to various embodiments, the system can be implemented on any one or more suitable electronic devices equipped to receive, store, and present information. Such electronic devices may including, for example, any combination of server(s), desktop computer(s), laptop computer (s), smartphone(s), tablet(s), wearable computing device(s), and/or the like.

Although the system is described herein in connection with an implementation in a client/server architecture, one skilled in the art will recognize that the techniques described herein can be implemented in other contexts, and indeed in any suitable device. Accordingly, the following description is intended to illustrate various embodiments by way of example, rather than to limit scope.

Figure 1:
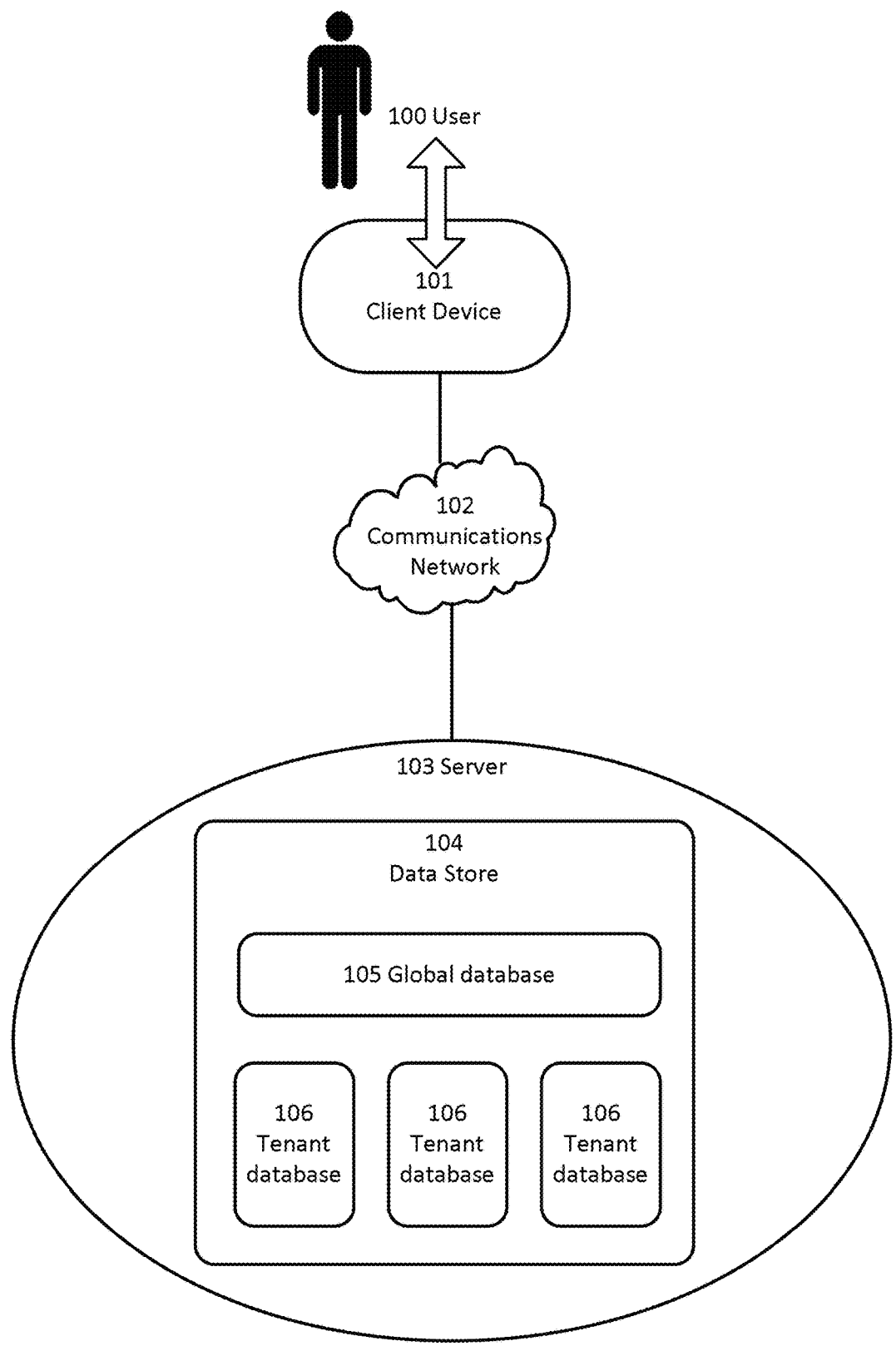
FIG. 1 is a block diagram depicting a hardware architecture for a system for providing secure access to multi-tenant relational data in a client/server arrangement, according to one embodiment.

Referring now to FIG. 1, there is shown a block diagram depicting a hardware architecture for a system for providing secure access to multi-tenant relational data in a client/server arrangement, including at least one client device 101 and at least one server 103, according to one embodiment. Client device(s) 101 and server(s) 103 may be any suitable electronic devices configured to perform the steps described herein.

Each server 103 includes one or more data store(s) 104. In at least one embodiment, each data store 104 includes a global database 105 and any number of tenant databases 106. Each tenant database 106 includes data for one tenant, which may be an entity such as a company. Any number of data stores 104 can be provided, and they may be implemented using a single server 103 or a number of different servers 103.

In at least one embodiment, data store(s) 104 may be organized into one or more well-ordered data sets, with one or more data entries in each set. Data store(s) 104, however, can have any suitable structure. Accordingly, the particular organization of data store(s) 104 need not resemble the form in which information from data store(s) 104 is displayed to user 100. In at least one embodiment, an identifying label is also stored along with each data entry, to be displayed along with each data entry.

In at least one embodiment, data store(s) 104 may be organized in a file system, using well known storage architectures and data structures, such as relational databases. Examples include Oracle, MySQL, PostgreSQL. Appropriate indexing can be provided to associate data elements in data store(s) 104 with each other. Each database, such as global database 105 and/or tenant database(s) 106, may include one or more data sets, which may include data records, metadata, and/or other data (not shown).

Server 103 communicates with client device(s) 101 via any suitable communications network 102. Any suitable type of communications network 102, such as the Internet, can be used as the mechanism for transmitting data between client device 101 and server 103, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 101 transmits requests for data via communications network 102, and receives responses from server 103 containing the requested data. Such requests may be sent via HTTP as remote procedure calls or the like. Communications network 102 may employ any known technologies for ensure secure communications between server 103 and client device(s) 101.

In at least one embodiment, server 103 may include additional components as needed for retrieving data from data store 104 in response to requests from client device 101.

In some embodiments, the data within data store 104 of server 103 may be distributed among multiple physical servers. Thus, server 103 as depicted in FIG. 1 may represent one or more physical servers, which may communicate with each other via the communications network 102 and/or one or more other networks (not shown).

User 100 interacts with client device 101 by providing input to device 101 and by viewing output presented by device 101. Such interactions are described in more detail herein.

Figure 2:
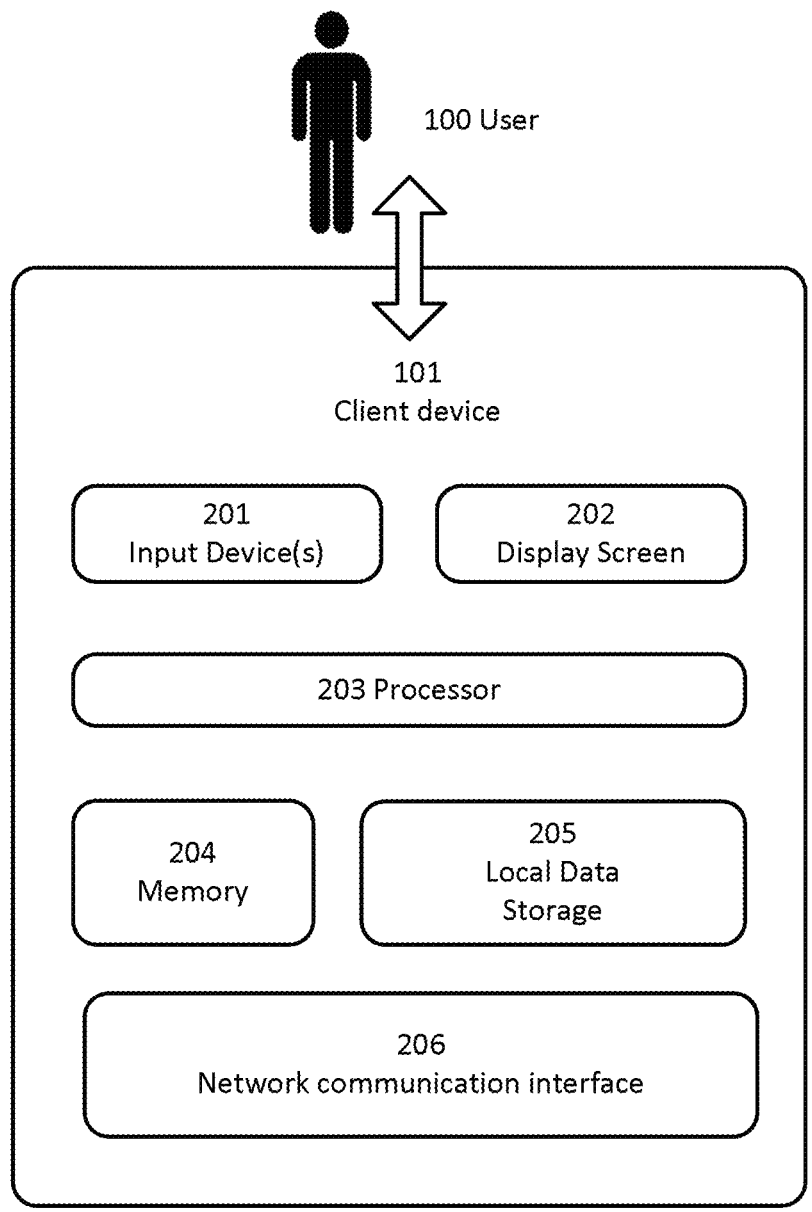
FIG. 2 is a block diagram depicting a hardware architecture for a client device that can be used in connection with the architecture depicted in FIG. 1, according to one embodiment.

Referring now to FIG. 2, there is shown a block diagram depicting a hardware architecture for a client device 101 that can be used in connection with the architecture depicted in FIG. 1, according to one embodiment. As mentioned above, client device 101 can be any suitable electronic device, and can include several hardware components to implement the techniques described herein.

In at least one embodiment, client device 101 has a number of hardware components well-known to those skilled in the art. Input device(s) 201 can include any element(s) that receive input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Display screen 202 can be any element that graphically displays information, such as data obtained from databases 105, 106, as well as user interface elements that can facilitate interaction with such information. In at least one embodiment where only some of the desired output is presented at a time, a dynamic control, such as a scrolling mechanism, may be available via input device 201 to change which information is currently displayed, and/or to alter the manner in which the information is displayed.

Local data storage 205 can be any magnetic, optical, or electronic storage device for data in digital form; examples include magnetic hard drive, CD-ROM, DVD-ROM, flash drive, USB hard drive, or the like. In various embodiments, local data storage 205 is detachable or removable from client device 101, or it may be is fixed within client device 101.

In at least one embodiment, local data storage 205 stores information that can be utilized and/or displayed according to the techniques described below. Local data storage 205 may be implemented in a database or using any other suitable arrangement. In another embodiment, data can be stored elsewhere, and retrieved by client device 101 when needed for presentation to user 100. Local data storage 205 may store one or more data sets, which may be used for a variety of purposes and may include a wide variety of files, records, and/or other data. In at least one embodiment, global database 105 and/or tenant database(s) 106 can be stored in local data storage 205, either in whole or in part, instead of or in addition to being stored at server(s) 103.

In some embodiments, records from global database 105 and/or tenant database(s) 106 can include elements distributed between server 103 and client device 101 and/or other computing devices in order to facilitate secure and/or effective communication between these computing devices. In some embodiments, such records may all be stored primarily on server 103, and may be downloaded to client device 101 when needed by the user 100 for viewing and/or modification according to the techniques described herein. When viewing or modification is complete, the records may be updated on server 103. The corresponding copies of the records on client device 101 may be deleted.

Local data storage 205 can be local or remote with respect to the other components of client device 101. In at least one embodiment, client device 101 is configured to retrieve data from a remote data storage device when needed. Such communication between client device 101 and other components can take place wirelessly, by Ethernet connection, via a computing network such as the Internet, via a cellular network, or by any other appropriate means.

Processor 203 can be a conventional microprocessor for performing operations on data under the direction of software, according to well-known techniques. Memory 204 can be random-access memory, having a structure and architecture as are known in the art, for use by processor 203 in the course of running software, presenting information to user 100, receiving input from user 100, and/or communicating with server 103.

In at least one embodiment, the system is implemented using a "black box" approach, whereby data storage and processing are done independently from user input/output. An example of such an approach is a web-based implementation, wherein client device 101 runs a browser that provides a user interface for interacting with web pages and/or other web-based resources generated by server 103. Items from data store 104 can be presented as part of such web pages and/or other web-based resources, using known protocols and languages such as Hypertext Markup Language (HTML), Java, JavaScript, and the like.

Client device 101 can be any electronic device incorporating the elements depicted in FIG. 2, such as a desktop computer, laptop computer, personal digital assistant (PDA), cellular telephone, smartphone, music player, handheld computer, tablet computer, kiosk, game system, wearable device, or the like.

In one embodiment, some or all of the system can be implemented as software written in any suitable computer programming language, whether in a standalone or client/server architecture. Alternatively, it may be implemented and/or embedded in hardware.

Database Architecture

Figure 3:
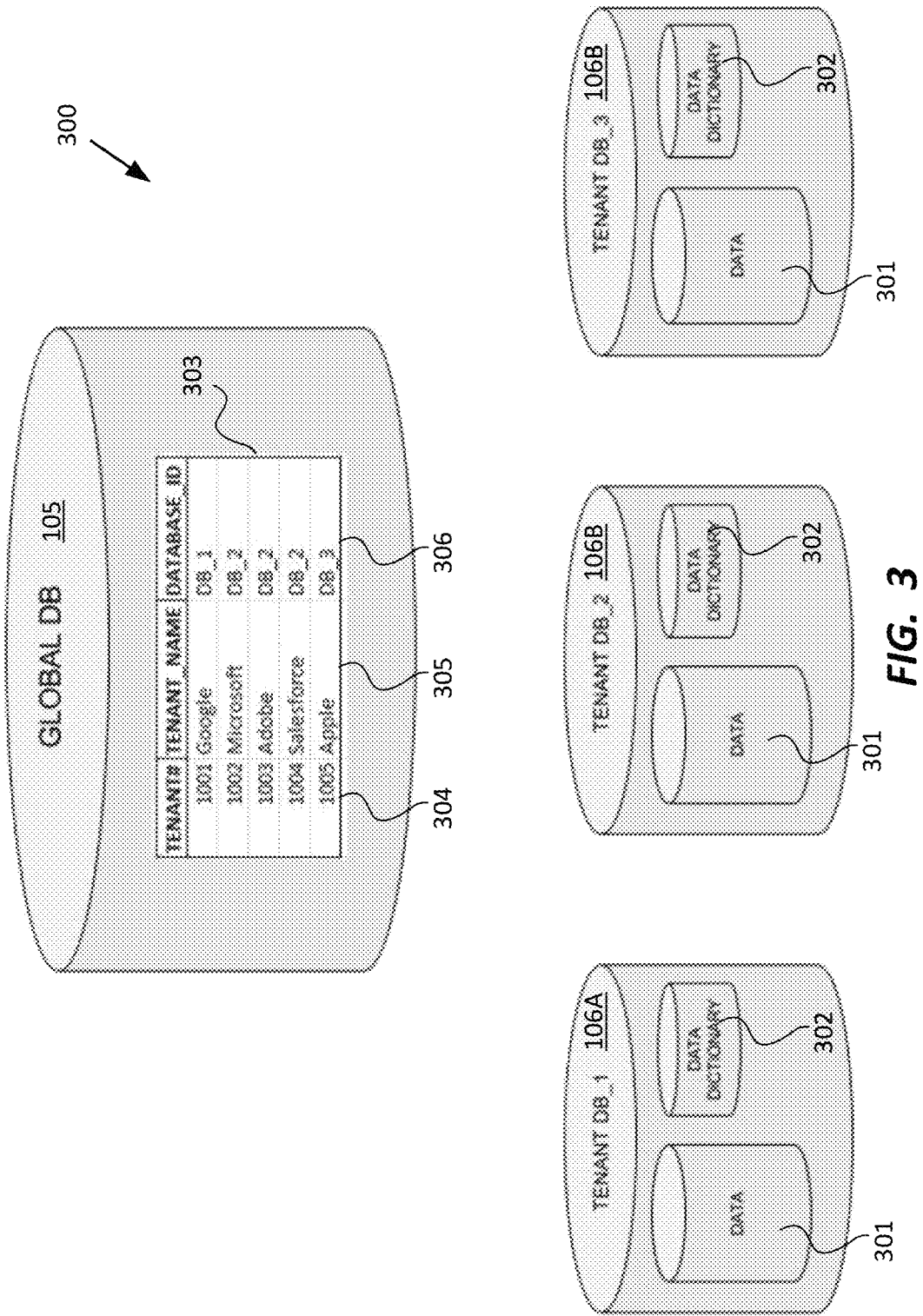
FIG. 3 is a block diagram depicting an example of a multi-tenant database architecture, according to one embodiment.

Referring now to FIG. 3, there is shown a block diagram depicting an example of a multi-tenant database architecture 300, according to one embodiment. In at least one embodiment, this architecture 300 can be implemented in a hardware architecture as depicted in FIG. 1, although other implementations are possible.

Global database 105 includes table 303 that associates tenant identifiers 304 with tenant names 305, and also specifies, in column 306, which tenant database 106 contains data records for each tenant. Table 303 can be stored in any suitable format, such as for example a simple flat database table structure. In the example of FIG. 3, five records are included in table 303, specifying information for five tenants: one tenant's data records are stored in tenant database 106A (identified as "DB_1"), another tenant's data records are stored in tenant database 106C (identified as "DB_3"), and the other three tenants' data records are stored in tenant database 106B (identified as "DB_2").

Each tenant database 106A, 106B, 106C contains stored data 301, as well as stored data dictionary 302 that specifies the layout and arrangement for the data 301 stored in that database 106. Stored data 301 can be any kind of data relevant to that tenant.

Figure 4A:
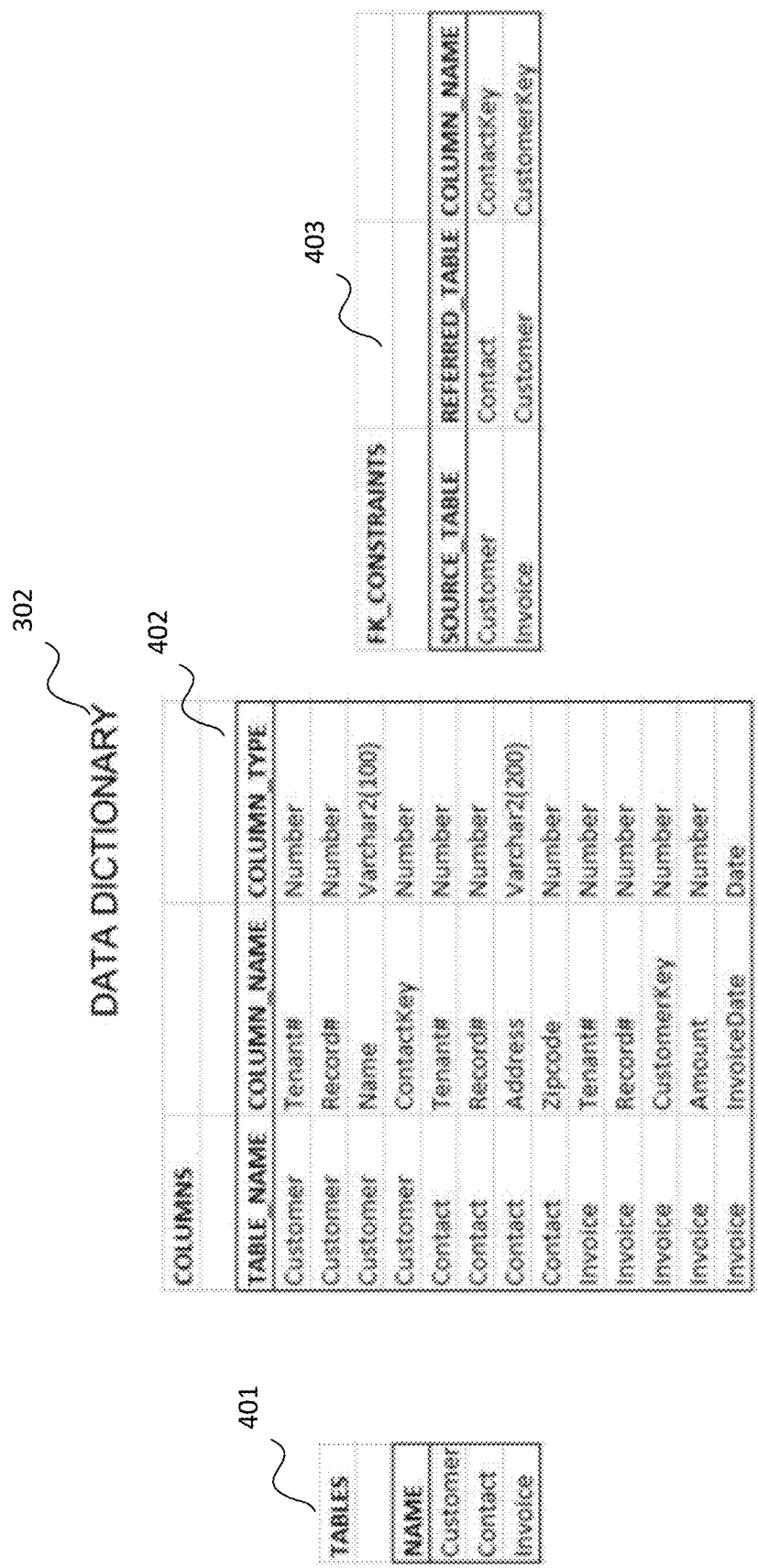

FIGS. 4A and 4B depict examples of data tables for organizing data dictionary 302 and underlying data 301 in a tenant database 106, according to one embodiment. In this example, data dictionary 302 includes three tables, as follows:

Tables table 401, specifying the three tables included in data 301: customer table 404, contact table 405, and invoice table 406.

Columns table 402, specifying the columns to be found in each table included in data 301. Each record in columns table 402 specifies a table name, a column name, and a column type.

Foreign key (FK) constraints table 403, specifying permissible values for certain fields in one or more tables. These values can be specified with reference to another table, so as to establish relationships between the tables. In the example, the "ContactKey" column of customer table 404 is constrained by "Record #" values in contact table 405. Similarly, the "CustomerKey" column of invoice table 406 is constrained by "Record #" values in customer table 404.

Method of Operation

Figure 8:
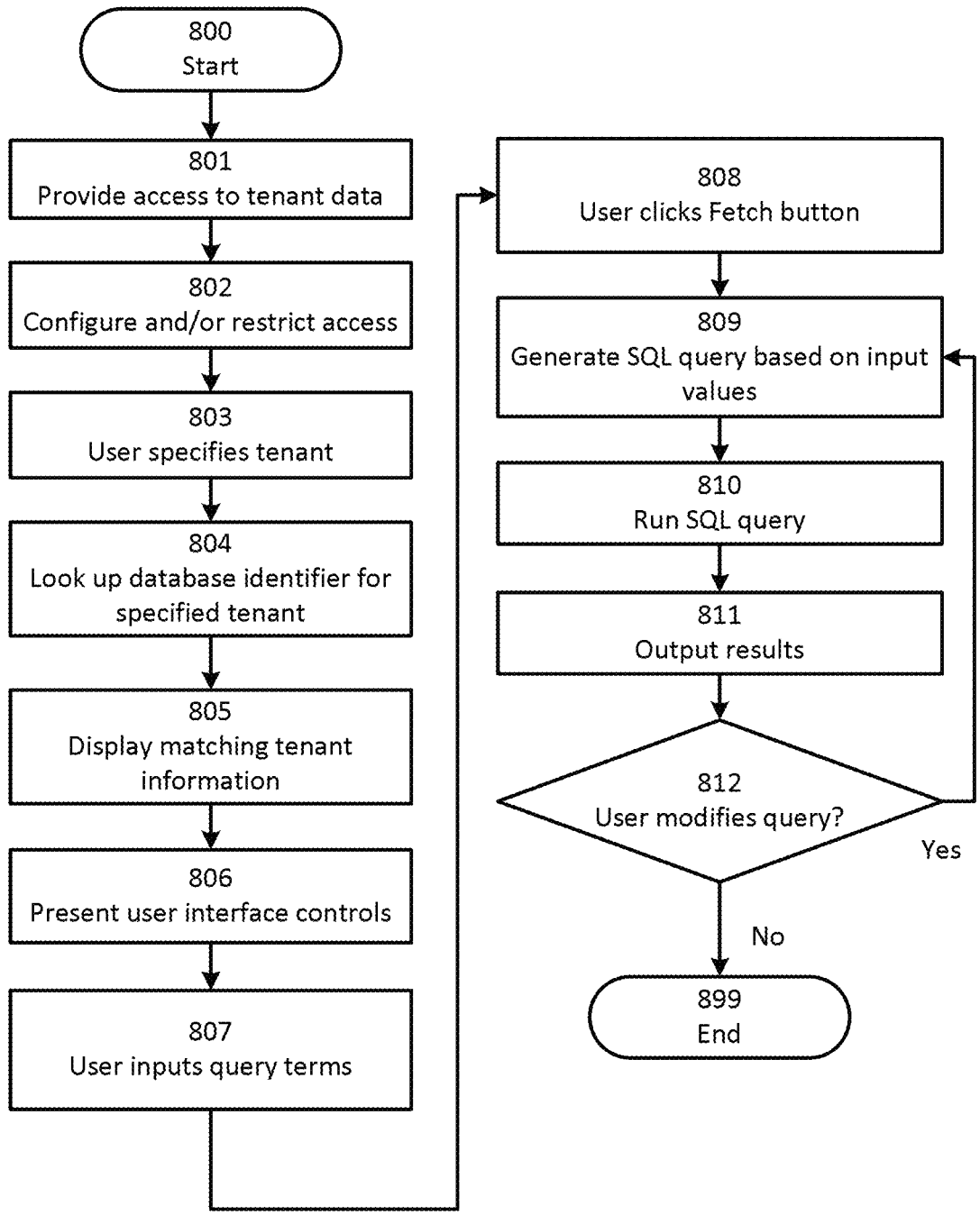
FIG. 8 is a flow diagram depicting a method for providing secure access to multi-tenant relational data, according to one embodiment.

Referring now to FIG. 8, there is a flow diagram depicting a method for providing secure access to multi-tenant relational data, according to one embodiment. In at least one embodiment, the method depicted in FIG. 8 can be implemented using the hardware architecture shown in FIGS. 1 and 2, along with database architectures such as those depicted in FIGS. 3 and 4.

For illustrative purposes, the method of FIG. 8 will be described with reference to an example of a user interface for implementing the techniques and steps described therein. Referring also to FIGS. 5A, 5B, 5C, and 6, there are shown examples of operation of such a user interface.

Initially, users 100 are provided access 801 to data associated with one or more tenants. This can include providing individual accounts to users 100, such as developers, to access a query tool that performs the functions described herein. Optionally, a security team can configure 802 the system so that certain tables, columns, and/or rows can be excluded from access by certain users 100, for example if such tables, columns, and/or rows contain sensitive data.

Figure 5A:
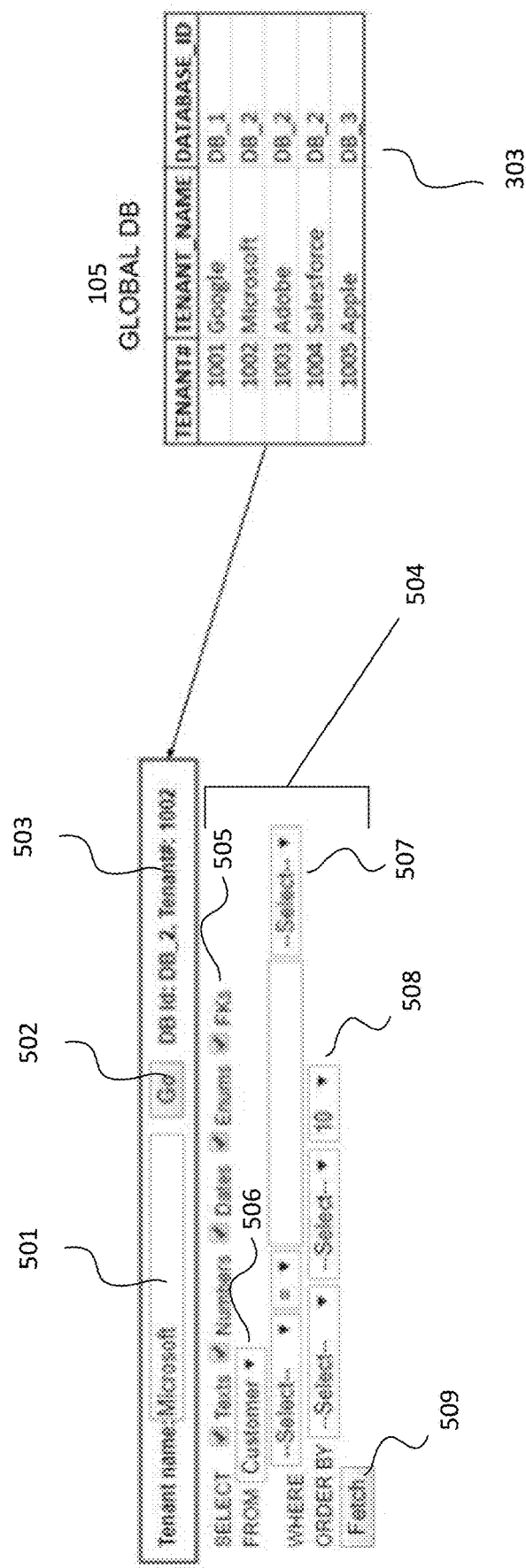
FIGS. 5A, 5B, 5C, and 6 depict examples of operation of a user interface for allowing secure, limited access to specific data records within a multi-tenant database, according to one embodiment.

User 100 specifies 803 a tenant, by inputting a tenant name, ID number, or other identifier. As shown in FIG. 5A, such input can be provided in field 501. Once user 100 enters the tenant identifier in field 501 and clicks on Go button 502, the system looks up 804 the database identifier for the specified tenant in table 303 of global database 105, and displays 805 the matching tenant information 503. In at least one embodiment, step 804 is performed by calculating a hash value from the entered tenant identifier, and comparing it against previously calculated hash values for data in global database 105.

In addition, once the tenant identifier has been specified, user interface controls 504 are presented 806, allowing user 100 to construct a query for database records. In at least one embodiment, such controls 504 include pop-up menus populated with values retrieved from tables in the appropriate tenant database 106, so that the user can select among valid values when constructing the query. For example, as depicted in FIG. 5A, controls 504 can include:

- Selection checkboxes 505, allowing user 100 to specify the data types to be included in the query results. Examples include text, numbers, dates, enumerated data (enums), and/or foreign keys.
- Source selection pop-up menu 506, allowing user 100 to specify the table to be queried.
- Parameter pop-up menus 507, allowing user 100 to specify query parameters. These may include, for example, parameters for the values of one or more fields in the table being queried.
- Order menus 508, specifying a sort order for displaying the results. This can be specified with respect to one or more fields in the table being queried.

Figure 5B:
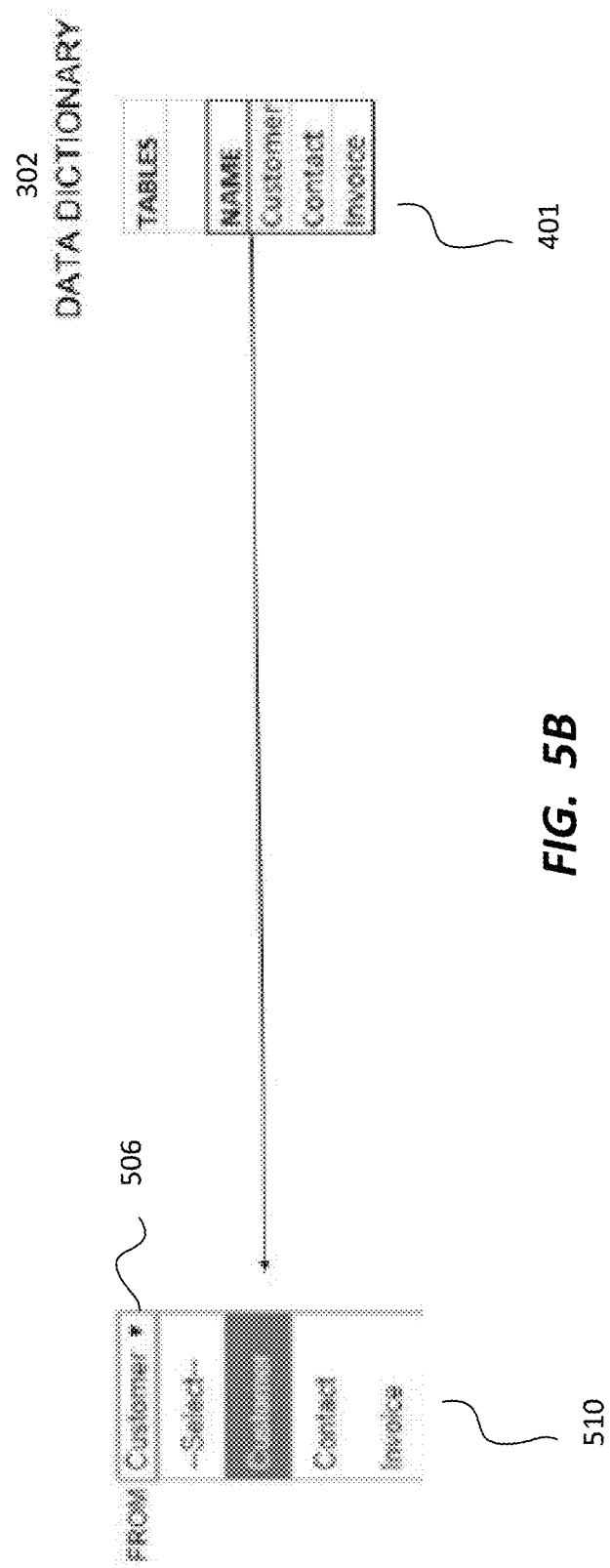

As shown in FIG. 5B, in at least one embodiment, source selection pop-up menu 506 is populated by entries 510 obtained from tables table 401 of data dictionary 302. In this manner, user's 100 selection of a data source is constrained to those that are available for the selected tenant, based on data dictionary 302. User 100 therefore does not need to remember the exact name of the desired data source, or which choices are available, as he or she is presented with menu 506 containing all valid choices. Selecting one simply involves clicking on the corresponding entry 510 from menu 506.

Figure 5C:
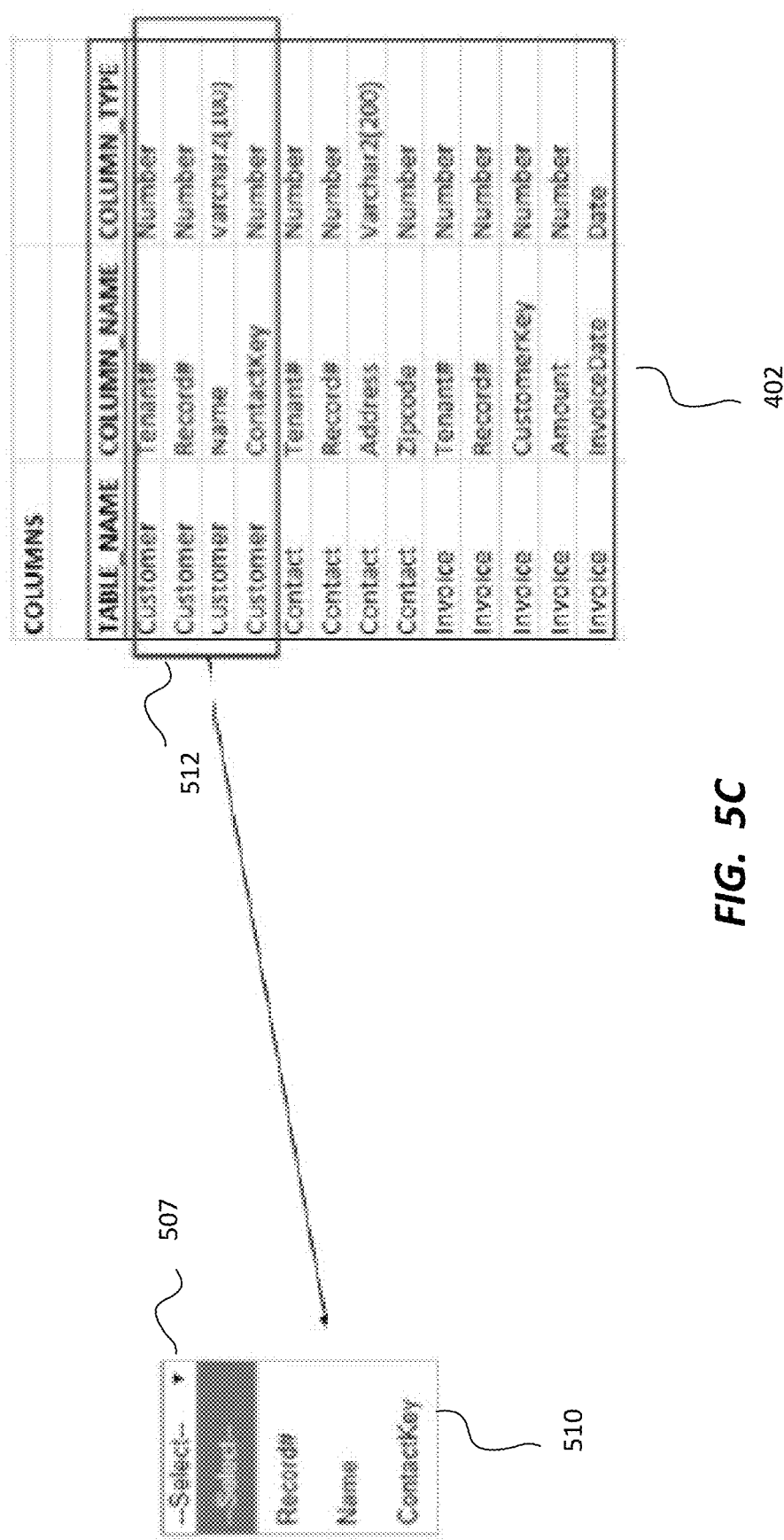

As shown in FIG. 5C, in at least one embodiment, parameter pop-up menu 507 is populated by entries 511 obtained from columns table 402 of data dictionary 302. Specifically, menu 507 is populated based on those records 512 in table 402 that have a table name corresponding to the table name selected from menu 506. In this manner, user's 100 selection of a field on which to specify a parameter is constrained to those fields that are valid for the selected table and tenant, based on data dictionary 302. User 100 therefore does not need to remember the exact name of the field, or which choices are available, as he or she is presented with menu 507 containing all valid choices. Selecting one simply involves clicking on the corresponding entry 511 from menu 507.

User 100 inputs 807 query terms, using the presented user interface controls 504, and clicks 808 Fetch button 509 to initiate the query. The system generates 809 an SQL query from the input values, and then runs 810 the query and outputs 811 results, for example on display screen 202 or some other output device. User 100 can then be given the opportunity to modify 812 the query; otherwise, the method ends 899.

In at least one embodiment, step 810 is performed by calculating hash value(s) from the entered query parameter(s), and comparing such values against previously calculated hash values for data in tenant database 106.

One skilled in the art will recognize that the particular user interface elements shown in FIGS. 5A, 5B, and 5C, and their arrangement, are examples only. Many other elements and arrangements can be used to implement the techniques described herein. For example, a list of radio button choices can be provided instead of a pop-up menu, or other types of controls can be used.

Figure 7A:
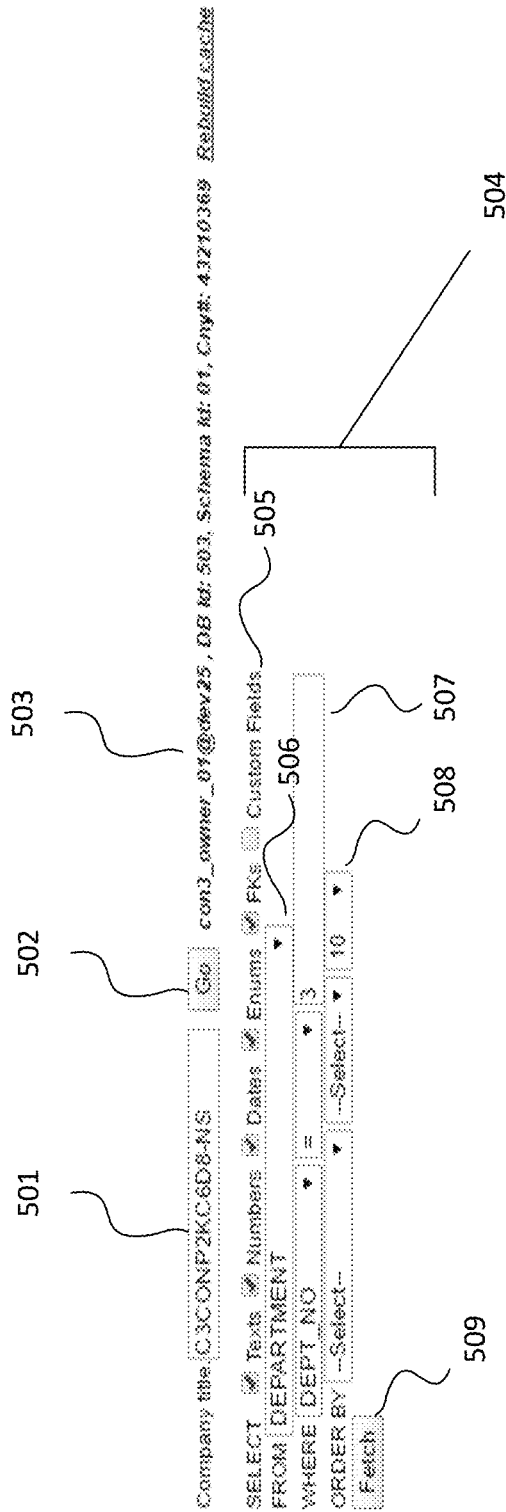
FIGS. 7A through 7C depict additional examples of operation of a user interface for allowing secure, limited access to specific data records within a multi-tenant database, according to one embodiment.

Referring now to FIG. 7A, there is shown an example of user interface controls 504 after user 100 has provided input but before he or she has clicked on Fetch button 509. Specifically, in this example, table "department" has been selected using source selection pop-up menu 506, and parameter "dept_no=3" has been specified using parameter pop-up menus 507.

In at least one embodiment, user interface controls 504 allow user 100 to specify records from a specific table using values of one or more of the table's columns as a query filter. In at least one embodiment, user 100 can also use select a set of higher level data types to retrieve, rather than specific columns.

In at least one embodiment, a maximum number of rows that can be retrieved per query can be specified.

Figure 7B:
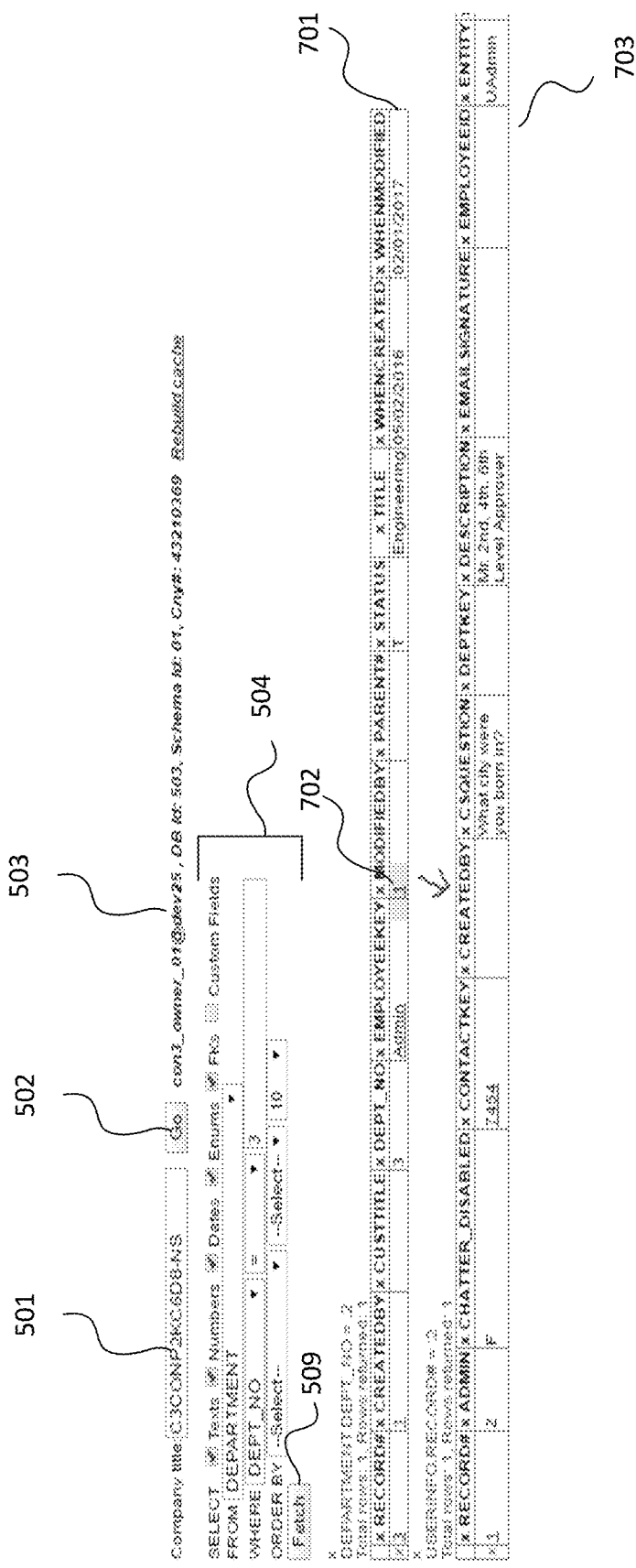

In at least one embodiment, the system provides access to data from a related table by rendering a foreign key (FK) value as a hyperlink. Clicking on the hyperlink causes the system to retrieve the related record. Referring now to FIG. 7B, there is shown an example. Once user 100 has clicked on Fetch button 509, record 701 is displayed, including data retrieved in accordance with the specified query parameters. Foreign key value 702 is presented as a hyperlink. Clicking on this hyperlink causes record 703 from a different table to be displayed.

Figure 7C:
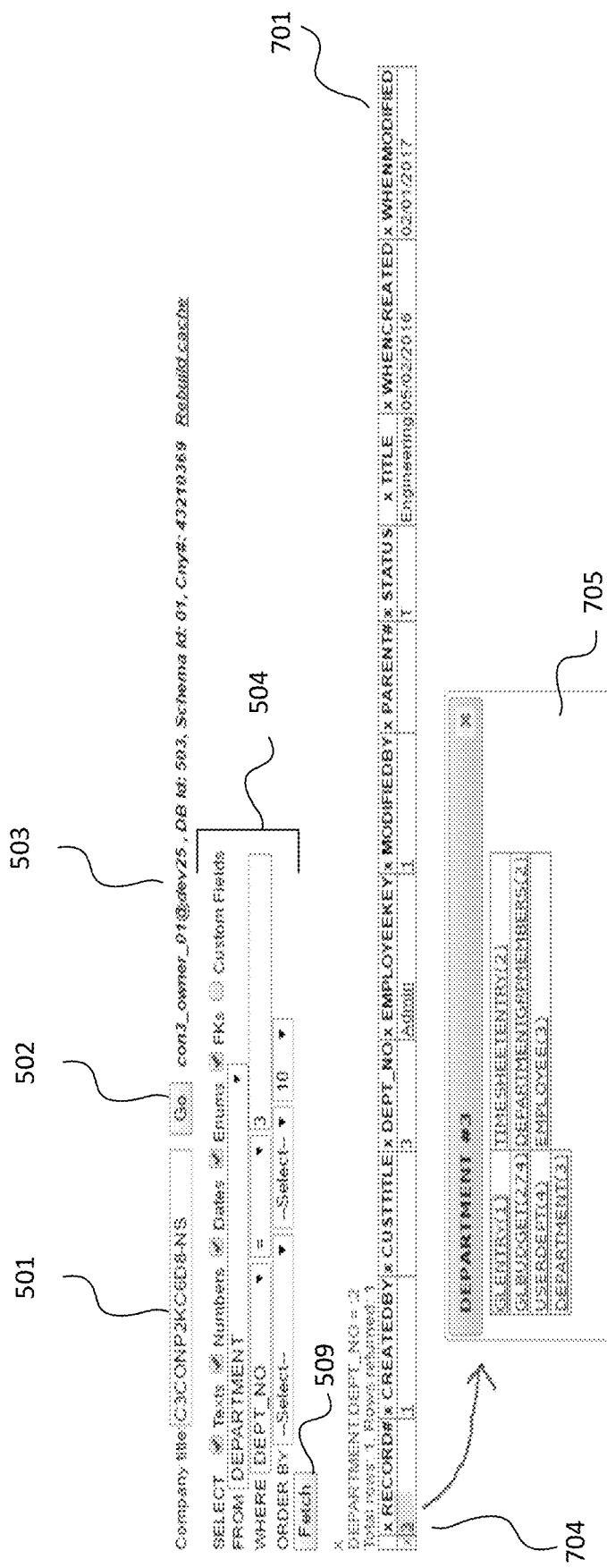

In at least one embodiment, primary key (PK) values are also rendered as hyperlinks. Clicking on such a PK causes a pop-up pane to be displayed, including a list of all tables that refer to that primary key and the number of related records in each such table. Referring now to FIG. 7C, there is shown an example. Again, once user 100 has clicked on Fetch button 509, record 701 is displayed, including data retrieved in accordance with the specified query parameters. Primary key value 704 is presented as a hyperlink. Clicking on this hyperlink causes pane 705 to be displayed, including a list of all tables that refer to that primary key and the number of related records in each such table. In at least one embodiment, as shown, the items in the list shown in pane 705 are presented as hyperlinks; user 100 can click on these to be taken to the corresponding table.

In at least one embodiment, all SQL queries that are generated using the query tool of the system are logged against user's 100 account, making it easy to track requests and to repeat past requests.

Figure 6:
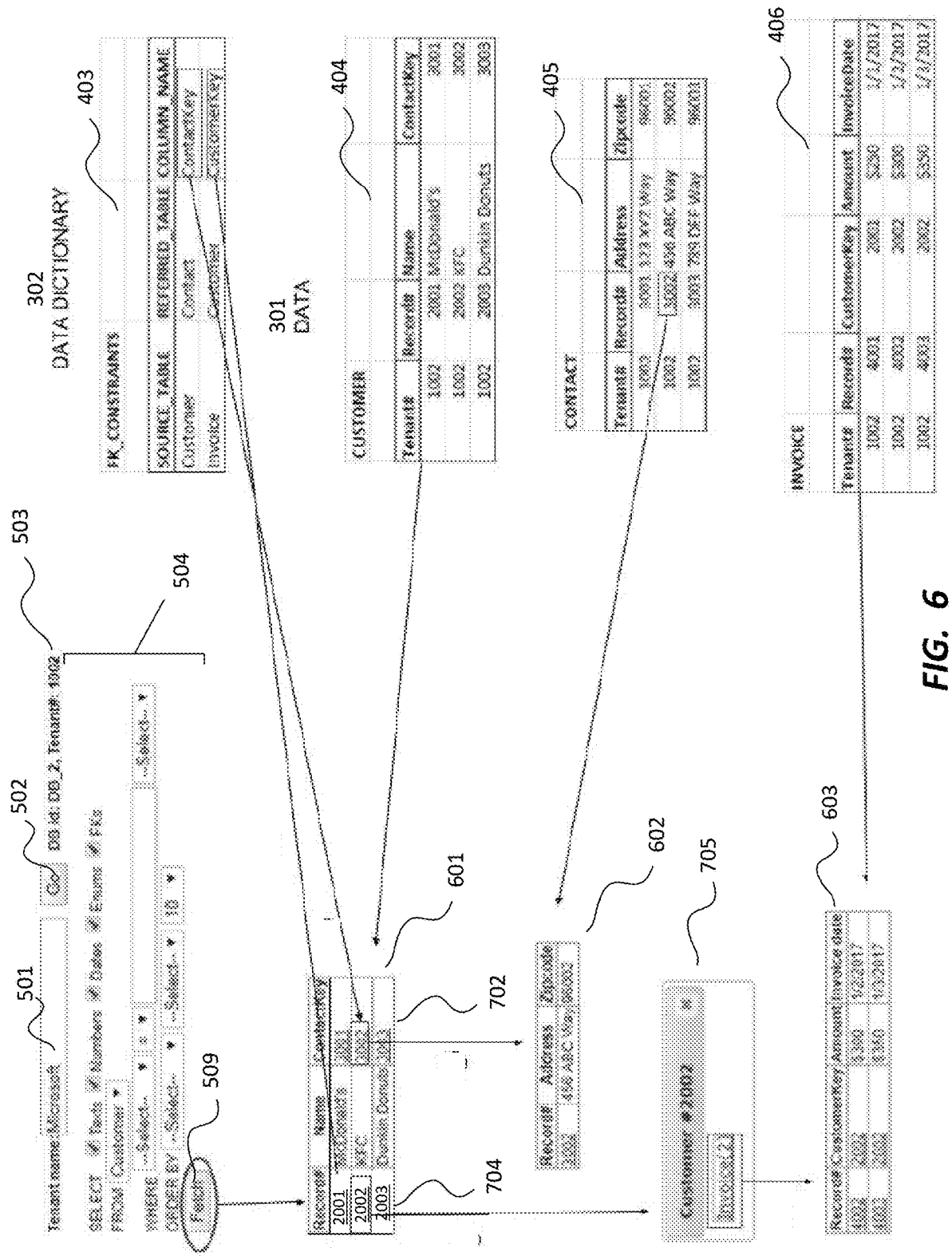

Referring now to FIG. 6, there is shown a comprehensive example of construction of a data query using the techniques described herein.

As described above, user 100 enters the tenant name in field 501 and clicks Go button 502. Database identifier and tenant identifier 503 are displayed. User 100 then makes selections using user interface controls 504; in this example, user 100 selects "customer" from source selection pop-up menu 506. User 100 then clicks Fetch button 509.

Table 601 is displayed. Table 601 contains records from customer table 404, since that is the table corresponding to user's 100 selection in menu 506. As described above, primary key values 704 are presented as hyperlinks, based on the relationship specified in table 403. As described above, foreign key values 702 are also presented as hyperlinks, based on the relationship specified in table 404.

Clicking on one of primary key values 704 (in this case, value "2002") activates pane 705, including a list of tables that refer to that primary key value and the number of related records in each such table. In this case, pane 705 includes hyperlink 604, which indicates that the Invoice table refers to the primary key value 704 of "2002", and that there are two records related to that primary key value 704.

Clicking on hyperlink 604 causes drill-down table 603 to be displayed, including all records from invoice table 406 that relate to customer key value "2002".

Advantages

The described techniques provide numerous advantages over prior systems. For example, using the system described herein, user 100 does not need to know which database contains data for the particular tenant he or she is interested in. Rather, user 100 merely enters or selects the tenant name or tenant identifier in field 501, and the system automatically populates user interface controls 504 with the appropriate selection criteria.

In addition, the described system provides a mechanism by which users 100 can be granted access to certain portions of tenant data without being granted access other, more sensitive portions or to data associated with other tenants. In at least one embodiment, if user 100 clicks on a link that relates to data that user 100 is not authorized to access, a message can be displayed to that effect.

In at least one embodiment, all operations of the described system are performed in real-time, allowing user 100 instant access to relevant data across a multi-tenant architecture.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method for providing secure access to data in a relational database system comprising stored data for a plurality of tenants, the method comprising:
   at an input device, receiving user input specifying one of the plurality of tenants;
   at a processor, transmitting, to a storage device, a request to look up the specified tenant in a global database;
   at the processor, receiving, from the storage device, an identifier of a tenant database comprising data relating to the specified tenant;
   at a display device, presenting user interface controls for specifying query terms for data relating to the specified tenant;
   at the input device, receiving user input via the user interface controls, the user input specifying query terms for data relating to the specified tenant;
   at the processor, generating a query based on the specified query terms;
   at the processor, transmitting a query request based on the specified query terms to a storage device comprising the identified tenant database;
   at the processor, receiving, from the storage device, query results that identify one or more records comprising data matching the specified query terms, each identified record belonging to a table;
   at the display device, outputting one or more primary hyperlinks, each primary hyperlink being associated with at least a subset of the records identified by the query results;
   at the input device, receiving user input activating one of the primary hyperlinks;
   responsive to the activated primary hyperlink being associated with only one record, displaying the record;
   responsive to the activated primary hyperlink being associated with a plurality of records and all records in the plurality of records associated with the activated primary hyperlink belong to the same table, displaying a list of all records in the plurality of records; and
   responsive to the activated primary hyperlink being associated with a plurality of records and at least one record in the plurality of records associated with the activated primary hyperlink belongs to a different table than at least one other record in the plurality of records associated with the activated primary hyperlink, displaying a pane comprising a plurality of secondary hyperlinks, each secondary hyperlink linking to a different table comprising a different subset of the plurality of records associated with the activated primary hyperlink, wherein the displayed pane does not comprise any records associated with the activated primary hyperlink and does not comprise any records associated with any of the secondary hyperlinks.

2. The method of claim 1, wherein each primary hyperlink comprises a foreign key value.

3. The method of claim 1, wherein each secondary hyperlink indicates the number of identified records in the table to which it links.

4. The method of claim 1, wherein presenting user interface controls for specifying query terms for data relating to the specified tenant comprises:
   at the display device, presenting a first user interface control for selecting among a plurality of tables in the identified tenant database;
   at the input device, receiving user input via the user interface controls to select one of the tables in the identified tenant database; and
   at the display device, presenting additional user interface controls for specifying query terms for fields in the selected table.

5. The method of claim 4, wherein:
   presenting the first user interface control comprises displaying a menu comprising entries corresponding to tables in the identified tenant database;
   receiving user input via the user interface controls to select one of the tables comprises receiving user selection of one of the entries in the menu; and
   presenting additional user interface controls comprises presenting at least one additional menu comprising entries corresponding to tables for fields in the selected table.

6. The method of claim 5, wherein receiving user input specifying query terms for data relating to the specified tenant comprises receiving user selection of one of the entries in the at least one additional menu.

7. The method of claim 1, wherein the storage device stores the global database and a plurality of tenant databases, and wherein receiving an identifier of a tenant database comprises receiving an identifier of one of the plurality of tenant databases.

8. The method of claim 1, wherein a first storage device stores the global database and a second storage device stores a plurality of tenant databases, and wherein receiving an identifier of a tenant database comprises receiving an identifier of one of the plurality of tenant databases.

9. The method of claim 1, wherein a first storage device stores the global database, and the plurality of tenant databases are stored in a plurality of additional storage devices, and wherein receiving an identifier of a tenant database comprises receiving an identifier of one of the plurality of tenant databases.

10. The method of claim 1, further comprising logging the query in an account associated with the user.

11. A non-transitory computer-readable medium for providing secure access to data in a relational database system comprising stored data for a plurality of tenants, comprising instructions stored thereon, that, when executed by one or more processors, perform the steps of:
   causing an input device to receive user input specifying one of the plurality of tenants;
   transmitting, to a storage device, a request to look up the specified tenant in a global database;
   receiving, from the storage device, an identifier of a tenant database comprising data relating to the specified tenant;
   causing a display device to present user interface controls for specifying query terms for data relating to the specified tenant;
   causing the input device to receive user input via the user interface controls, the user input specifying query terms for data relating to the specified tenant;
   generating a query based on the specified query terms;
   transmitting a query request based on the specified query terms to a storage device comprising the identified tenant database;
   receiving, from the storage device, query results that identify one or more records comprising data matching the specified query terms, each identified record belonging to a table;
   causing the display device to output one or more primary hyperlinks, each primary hyperlink being associated with at least a subset of the records identified by the query results;
   causing the input device to receive user input activating one of the primary hyperlinks;
   responsive to the activated primary hyperlink being associated with only one record, causing the display device to display the record;
   responsive to the activated primary hyperlink being associated with a plurality of records and all records in the plurality of records associated with the activated primary hyperlink belong to the same table, causing the display device to display a list of all records in the plurality of records; and
   responsive to the activated primary hyperlink being associated with a plurality of records and at least one record in the plurality of records associated with the activated primary hyperlink belongs to a different table than at least one other record in the plurality of records associated with the activated primary hyperlink, causing the display device to display a pane comprising a plurality of secondary hyperlinks, each secondary hyperlink linking to a different table comprising a different subset of the plurality of records associated with the activated primary hyperlink, wherein the displayed pane does not comprise any records associated with the activated primary hyperlink and does not comprise any records associated with any of the secondary hyperlinks.

12. The non-transitory computer-readable medium of claim 11, wherein each primary hyperlink comprises a foreign key value.

13. The non-transitory computer-readable medium of claim 11, wherein each secondary hyperlink indicates the number of identified records in the table to which it links.

14. The non-transitory computer-readable medium of claim 11, wherein causing the display device to present user interface controls for specifying query terms for data relating to the specified tenant comprises:
   causing the display device to present a first user interface control for selecting among a plurality of tables in the identified tenant database;
   causing the input device to receive user input via the user interface controls to select one of the tables in the identified tenant database; and
   causing the display device to present additional user interface controls for specifying query terms for fields in the selected table.

15. The non-transitory computer-readable medium of claim 14, wherein:
   causing the display device to present the first user interface control comprises displaying a menu comprising entries corresponding to tables in the identified tenant database;
   causing the input device to receive user input via the user interface controls to select one of the tables comprises receiving user selection of one of the entries in the menu; and
   causing the display device to present additional user interface controls comprises causing the display device to present at least one additional menu comprising entries corresponding to tables for fields in the selected table.

16. The non-transitory computer-readable medium of claim 15, wherein causing the input device to receive user input specifying query terms for data relating to the specified tenant comprises causing the input device to receive user selection of one of the entries in the at least one additional menu.

17. The non-transitory computer-readable medium of claim 11, wherein the storage device stores the global database and a plurality of tenant databases, and wherein receiving an identifier of a tenant database comprises receiving an identifier of one of the plurality of tenant databases.

18. The non-transitory computer-readable medium of claim 11, wherein a first storage device stores the global database and a second storage device stores a plurality of tenant databases, and wherein receiving an identifier of a tenant database comprises receiving an identifier of one of the plurality of tenant databases.

19. The non-transitory computer-readable medium of claim 11, wherein a first storage device stores the global database, and the plurality of tenant databases are stored in a plurality of additional storage devices, and wherein receiving an identifier of a tenant database comprises receiving an identifier of one of the plurality of tenant databases.

20. The non-transitory computer-readable medium of claim 11, further comprising instructions that, when executed by one or more processors, perform the step of logging the query in an account associated with the user.

21. A system for providing secure access to data in a relational database system comprising stored data for a plurality of tenants, comprising:

an input device, configured to receive user input specifying one of the plurality of tenants;
a storage device configured to store a global database;
a processor, communicatively coupled to the input device and to the storage device, configured to perform the steps of:
  transmitting, to the storage device, a request to look up the specified tenant in the global database; and
  receiving, from the storage device, an identifier of a tenant database comprising data relating to the specified tenant; and
a display device, communicatively coupled to the processor, configured to present user interface controls for specifying query terms for data relating to the specified tenant;
wherein:
the input device is further configured to receive user input via the user interface controls, the user input specifying query terms for data relating to the specified tenant;
the processor is further configured to perform the steps of:
  generating a query based on the specified query terms;
  transmitting a query request based on the specified query terms to a storage device comprising the identified tenant database;
  receiving, from the storage device, query results that identify one or more records comprising data matching the specified query terms, each identified record belonging to a table; and
  causing the display device to output one or more primary hyperlinks, each primary hyperlink being associated with at least a subset of the records identified by the query results;
the input device is further configured to receive user input activating one of the primary hyperlinks; and
the display device is further configured to:
  responsive to the activated primary hyperlink being associated with only one record, display the record;
  responsive to the activated primary hyperlink being associated with a plurality of records and all records in the plurality of records associated with the activated primary hyperlink belong to the same table, display a list of all records in the plurality of records; and
  responsive to the activated primary hyperlink being associated with a plurality of records and at least one record in the plurality of records associated with the activated primary hyperlink belongs to a different table than at least one other record in the plurality of records associated with the activated primary hyperlink, display a pane comprising a plurality of secondary hyperlinks, each secondary hyperlink linking to a different table comprising a different subset of the plurality of records associated with the activated primary hyperlink, wherein the displayed pane does not comprise any records associated with the activated primary hyperlink and does not comprise any records associated with any of the secondary hyperlinks.

22. The system of claim 21, wherein each primary hyperlink comprises a foreign key value.

23. The system of claim 21, wherein each secondary hyperlink indicates the number of identified records in the table to which it links.

24. The system of claim 21, wherein:
presenting user interface controls for specifying query terms for data relating to the specified tenant comprises presenting a first user interface control for selecting among a plurality of tables in the identified tenant database;
the input device is further configured to receive user input via the user interface controls to select one of the tables in the identified tenant database; and
the display device is further configured to present additional user interface controls for specifying query terms for fields in the selected table.

25. The system of claim 24, wherein:
presenting the first user interface control comprises displaying a menu comprising entries corresponding to tables in the identified tenant database;
receiving user input via the user interface controls to select one of the tables comprises receiving user selection of one of the entries in the menu; and
presenting additional user interface controls comprises presenting at least one additional menu comprising entries corresponding to tables for fields in the selected table.

26. The system of claim 25, wherein receiving user input specifying query terms for data relating to the specified tenant comprises receiving user selection of one of the entries in the at least one additional menu.

27. The system of claim 21, wherein:
the storage device is further configured to store a plurality of tenant databases; and
receiving an identifier of a tenant database comprises receiving an identifier of one of the plurality of tenant databases.

28. The system of claim 21, further comprising:
a second storage device, communicatively coupled to the processor, configured to store a plurality of tenant databases;
wherein receiving an identifier of a tenant database comprises receiving an identifier of one of the plurality of tenant databases.

29. The system of claim 21, further comprising:
a plurality of additional storage devices, communicatively coupled to the processor, configured to store a plurality of tenant databases;
wherein receiving an identifier of a tenant database comprises receiving an identifier of one of the plurality of tenant databases.

30. The system of claim 21, wherein the processor is further configured to log the query in an account associated with the user.

* * * * *